United States Patent [19]

Rogers, Jr. et al.

[11] Patent Number: 5,287,531
[45] Date of Patent: Feb. 15, 1994

[54] DAISY-CHAINED SERIAL SHIFT REGISTER FOR DETERMINING CONFIGURATION OF REMOVABLE CIRCUIT BOARDS IN A COMPUTER SYSTEM

[75] Inventors: Harry R. Rogers, Jr., Spring; John A. Landry, Tomball; Javier F. Izquierdo, Houston, all of Tex.

[73] Assignee: Compaq Computer Corp., Houston, Tex.

[21] Appl. No.: 606,165

[22] Filed: Oct. 31, 1990

[51] Int. Cl.⁵ .............................................. G06F 12/02
[52] U.S. Cl. ..................................... 395/800; 395/700; 395/250; 364/238.7; 364/239.2; 364/965.7; 364/970.5
[58] Field of Search .................. 395/800, 700, 250; 364/DIG. 1, DIG. 2

[56] References Cited

U.S. PATENT DOCUMENTS 4,313,159  1/1982  Shoap .................................. 395/425
4,617,566 10/1986  Diamond ......................... 340/870.11
5,027,313  6/1991  Culley ................................. 395/425
5,056,015 10/1991  Baldwin et al. ..................... 395/500

Primary Examiner—Thomas C. Lee
Assistant Examiner—Dzung C. Nguyen
Attorney, Agent, or Firm—Pravel, Hewitt, Kimball & Krieger

[57] ABSTRACT

An apparatus for determining system configuration in a computer system using only one 8 bit data port. Permanent connections on each of the microprocessor and memory boards provide respective configuration and/or memory information about each board. The signals are stored in serial out shift registers associated with each board that are daisy chained together. These shift registers serially transmit the configuration information to one 8 bit data port, which then transmits this information to the computer system in 8 bit increments. If a given slot is empty it is automatically bypassed in the shift register daisy chain.

8 Claims, 6 Drawing Sheets

5,287,531

DAISY-CHAINED SERIAL SHIFT REGISTER FOR DETERMINING CONFIGURATION OF REMOVABLE CIRCUIT BOARDS IN A COMPUTER SYSTEM

BACKGROUND OF THE INVENTION

1. Field of the Invention

The present invention relates to the determination of system configuration in computer systems, and more particularly to automatically determining the type and number of processors and the amount of memory and its location throughout a computer system.

2. Discussion of the Prior Art

The number of areas where personal computers are being utilized is growing dramatically. The areas are varied, and as a result, have different requirements for the various subsystems forming a complete computer system. For example, personal computers used primarily for word processing have relatively modest requirements for installed memory and processor subsystems, have very high performance requirements for the mass storage subsystem and have varying requirements for the display subsystem, depending on the exact application, such as high resolution desktop publishing or simpler letter production, being performed. A data storage and retrieval oriented system needs larger amounts of memory, a faster processor, may have lesser mass storage requirements and generally has minimal display requirements. Complex spreadsheet applications require very large amounts of memory, high performance processors, average capability mass storage subsystems and have display requirements which vary depending on whether complex graphic presentations are desired. Simple spreadsheet applications need standard amounts of memory, average performance processors, average capability mass storage subsystems and have the same display requirements as complex spreadsheet applications. Computer automated design systems require large amounts of memory, very high performance processors, high performance mass storage systems and very high performance display components.

Because of production volume requirements and the reduced costs as volumes increase, it is desirable that as many common features as possible are combined into high volume boards. This has happened in the personal computer area by developing basic units of varying processor performance levels, with the other subsystems incorporated by the inclusion of interchangeable modules. Modules of the desired performance level are incorporated into the basic unit to tailor the basic processor unit to the desired complete computer system. Because of the inherent flexibility of this design approach, it becomes difficult to develop a single piece of software to control the system. The software cannot depend on a given configuration being present and so arrangements must be made to allow the software to understand the specific configuration. Additionally, the provisions must be made so the various modules forming the subsystems do not interfere with each other.

Personal computers have evolved from single microprocessor-based systems to computers systems capable of incorporating multiple processors. Some multiprocessor personal computer systems are initially offered with a single microprocessor, referred to as the primary processor, and one or more processor expansion slots into which may be inserted additional microprocessors, referred to as secondary processors. This provides added flexibility to the user because the number of microprocessors present within the computer system can be tailored to fit individual needs. However, the inclusion of optional microprocessor slots in personal computer systems has exacerbated software and hardware configuration problems because the system must now determine the type and number of processors present within the system.

The software and hardware configuration problems are also quite true in memory subsystems where it is common for the subsystem to be originally installed by a system integrator at one level and then changed by a relatively unskilled user. The change is performed by adding memory integrated circuits, either into previously available locations in a preexisting module, or changing the number or type of incorporated memory modules. This situation is further complicated because personal computers related to or compatible with products produced by International Business Machines Corporation have undergone a very complicated memory expansion path because of limitations in the various processors, operating systems, and designs which have developed over the years. As a result, various competing systems and memory allocation conflicts have developed, so that determining and setting memory size and location is extremely difficult.

Until recently, indication of memory size and location was performed by appropriately setting switches or jumpers provided by the manufacturer of the memory subsystem. This required that the person installing or upgrading the memory subsystem had a good knowledge of the environment, that is, the intended size of the memory components and location where they were to be located, both physically and in the address space of the computer, and where any other existing memory subsystem components were located. This knowledge requirement either made the installation very difficult for the unskilled owner or required installation by a skilled person, usually at a relatively large expense. The unskilled owner had to try and follow the often difficult to interpret instructions and hoped to get everything right. If not, the owner had to try again, thereby expending valuable time. After a sufficient number of unsuccessful attempts, the unskilled owner generally contacted a skilled individual for assistance. Thus, much time and effort was expended with minimal results.

It was therefore desirable that the memory size and address location be determined automatically and that any determined errors be indicated to the installer to allow a minimum of time and effort to be expended when installing or modifying a memory subsystem. One solution to the problem of memory configuration determination included an apparatus that automatically determined the maximum amount of memory available and its physical and address locations, determined if the memory was correctly installed, indicated any errors to the operator and enabled the maximum usable amount of memory. The apparatus included a base memory board which included a series of permanently enabled signals to indicate the amount of memory on the board. The signals were provided to a buffer which was connected to the data bus, enabling the system to read the state of the signals provided to the buffer. The base memory board had a series of connectors for addition of memory modules. Each memory module included a series of permanently enabled signals to indicate the amount of memory installed on the module. These signals were transmitted from the memory module to the buffer on the base board. If no memory module was installed in a given connector, the signals associated with that connector were set at a predefined level. The signals were provided to a buffer which was connected to the data bus, enabling the system to read the state of the signals provided to the buffer.

The above method for memory configuration determination proved satisfactory for awhile. However, as the number of memory modules and external memory cards increased, the total width of the buffer that held the memory configuration information became unwieldy. In addition, the incorporation of multiple processors in computer systems and the desirability that the type and number of processors resident in the computer system be determined automatically with the memory configuration information exacerbated the problem of the buffer width with regard to the system configuration information. Increased numbers of the relatively few available input/output (I/O) ports were needed to pass the buffer configuration information to the system for determination of the type and number of processors as well as the identification and location of memory modules in the system. Therefore, it became desirable that processor and memory module configuration information be determined automatically with the use of a minimal width buffer, thereby allowing a minimal number of I/O ports to be used to pass this information to the system.

SUMMARY OF THE INVENTION

The present invention includes an apparatus for automatically determining the type and number of microprocessors as well as the maximum amount of memory available and its physical location, determining if the processors and memory are correctly installed, and indicating any errors to the operator. The microprocessor and memory configuration and location information is conveyed to the computer system via one 8-bit data port, irrespective of the number of processor or memory boards installed in the system. The apparatus according to the present invention ignores empty processor or memory expansion slots in the computer system. In addition, processor and memory boards can be placed in various expansion slots in the computer system without effecting the determination of system configuration.

The apparatus according to the present invention includes one or more processors located on interchangeable boards, and also includes one base memory board and capabilities to use a plurality of expansion memory boards, if desired. Each of the processor boards within the system includes a series of permanently enabled signals which identify the board as being a processor board and identify the particular processor type and configuration. The base and expansion memory boards have a series of connectors for addition of memory modules. Each memory module includes a series of permanently enabled signals to indicate the amount and type of memory installed on the module. If no memory module is installed in a given connector, the signals associated with that connector are set at a predefined level. Each memory board also has a series of permanently enabled signals which identify the board as a memory board and identify the particular type of memory board.

Each processor and memory board configured within the system includes a serial and parallel in, serial out shift register that receives respective configuration information signals from either permanently enabled signals or the various installed memory modules, respectively. In addition, the computer system includes a serial and parallel in, serial out shift register which receives identification signals from each of the processors and memory boards present within the system. These shift registers are daisy chained together in a manner whereby each of the shift registers has a serial output connected to the serial input of the next successive shift register. The final shift register in the chain provides its serial output to the serial input of an 8-bit serial in, parallel out shift register which forms a portion of an 8-bit data port. The configuration and identification data is continually shifted in a serial manner into this port and is read by the computer system once after each 8-bit shift sequence to identify each of the respective boards within the system and determine the particular configuration and location information of each respective board. If a board is not installed the slot is automatically bypassed and the number of shift registers in the chain reduced. Thus, jumpers need not be set to indicate board presence.

BRIEF DESCRIPTION OF THE DRAWINGS

A better understanding of the present invention can be obtained when the following detailed description of the preferred embodiment is considered in conjunction with the following drawings, in which:

FIGS. 2A, 21, and 2C are a more detailed schematic diagram of the shift register logic circuitry located on the processor boards, memory boards, and system board of FIG. 1 according to the present invention;

DETAILED DESCRIPTION OF THE PREFERRED EMBODIMENT

Figure 1:
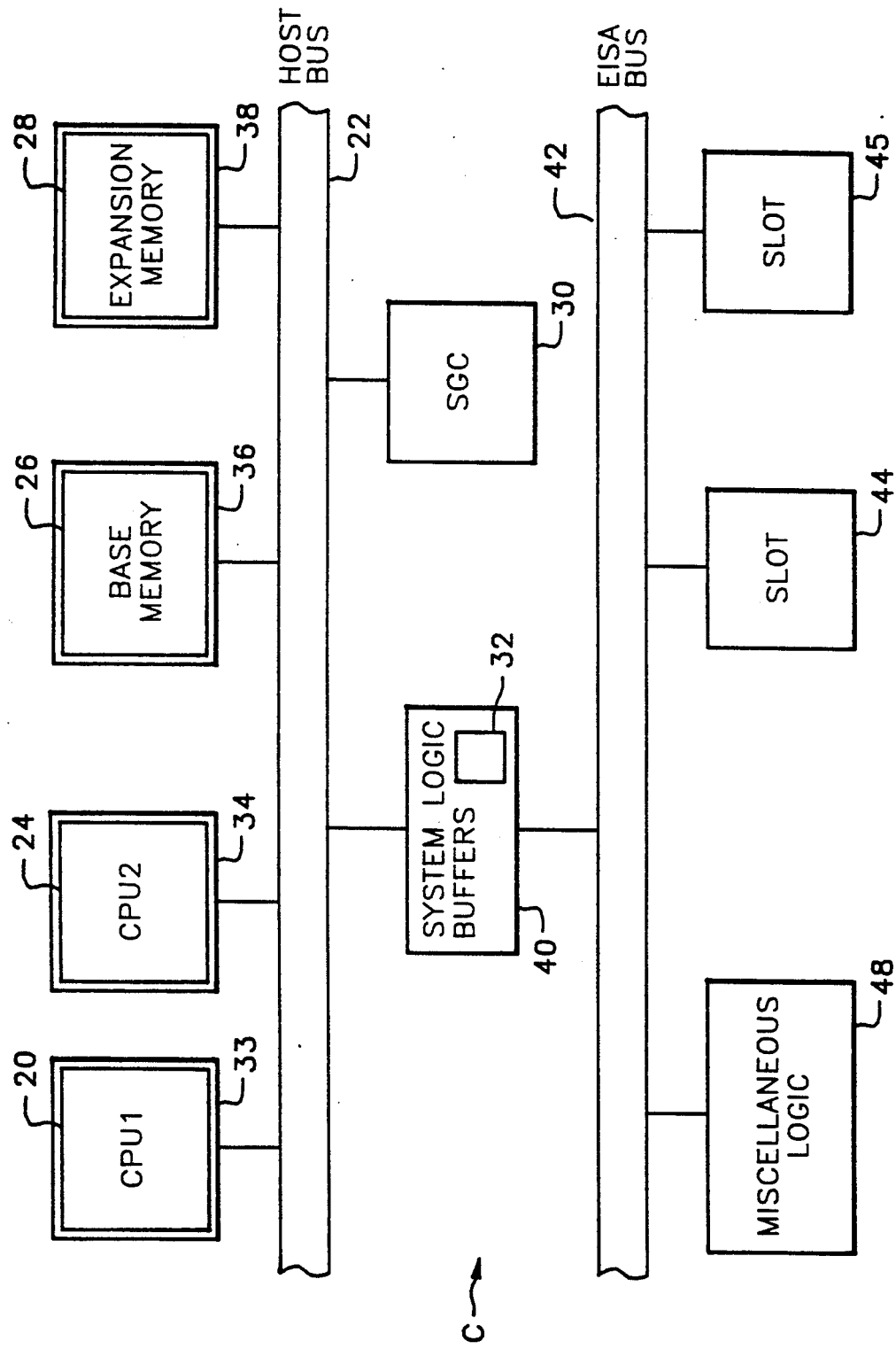
FIG. 1 is a block diagram of a general computer system incorporating the present invention.

Referring now to FIG. 1, the letter C refers to a personal computer system that includes an apparatus for system configuration determination according to the present invention. The personal computer system C includes a primary central processor board referred to as CPU1 20 attached to a host bus 22 through a slot 33. The CPU1 20 includes a series of permanently enabled signals which identify the board as a processor board and identify the particular processor type and configuration. The host bus 22 includes an address bus, a data bus, and various control lines. The host bus 22 also includes a series of option slots 34, 36, and 38 into which memory boards or an additional processor board may be placed. However, the use of additional processor or memory expansion slots is also contemplated.

The expansion slots 36 and 38 may include either base or expansion memory boards, and the remaining option slot 34 may include either a base or expansion memory board or a secondary processor board. In the preferred embodiment of the present invention, a base memory board 26 and an expansion memory board 28 are connected to the host bus 22 through the expansion slots 36 and 38, respectively, and a secondary microprocessor board referred to as the CPU2 24 is configured in the remaining expansion slot 34.

The base memory board 26 and the expansion memory board 28 have a series of connectors for addition of memory modules. Each memory module that is placed in the base memory board 26 and expansion memory board 28 include a series of permanently enabled signals to indicate the amount of memory installed on the module. If no memory module is installed in a given connector, the signals associated with that connector are set at a predefined level. In addition, the CPU2 24 includes a series of permanently enabled signals which identify the board as a processor board and identify the particular processor type and configuration.

The host bus 22 is connected through a block circuit 40 comprising various system control logic 32 and buffers to an input/output bus referred to as the Extended Industry Standard Architecture (EISA) bus 42. The EISA bus 42 is an extension of the Industry Standard Architecture (ISA) bus, which was used in the International Business Machines (IBM) AT personal computers. The EISA bus 42 includes several slots 44 and 45 for various input/output devices, as well as a block circuit 48 which includes numerous miscellaneous logic that is necessary for operation of the EISA bus 42.

Figure 2A:
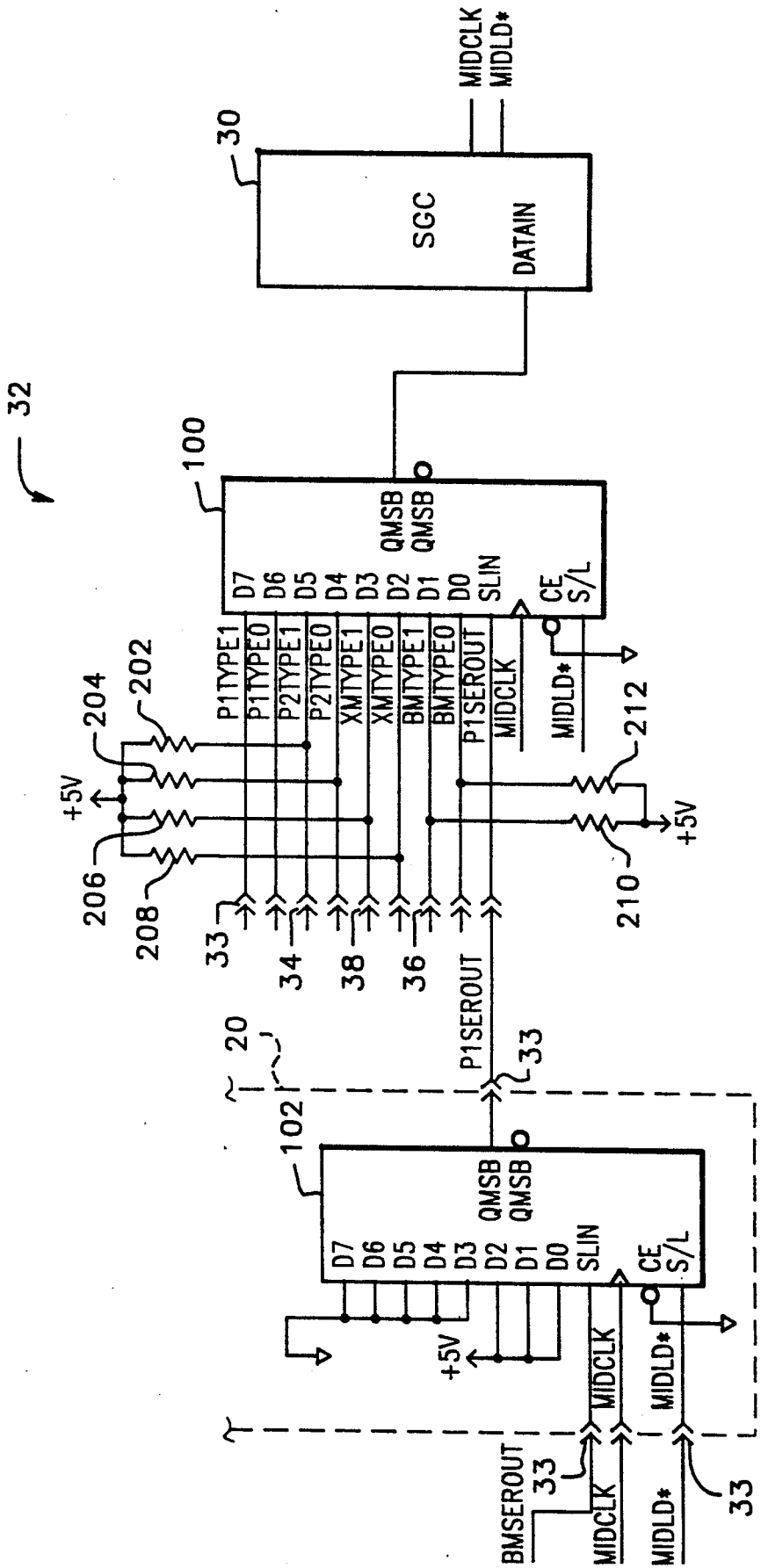
Figure 2B:
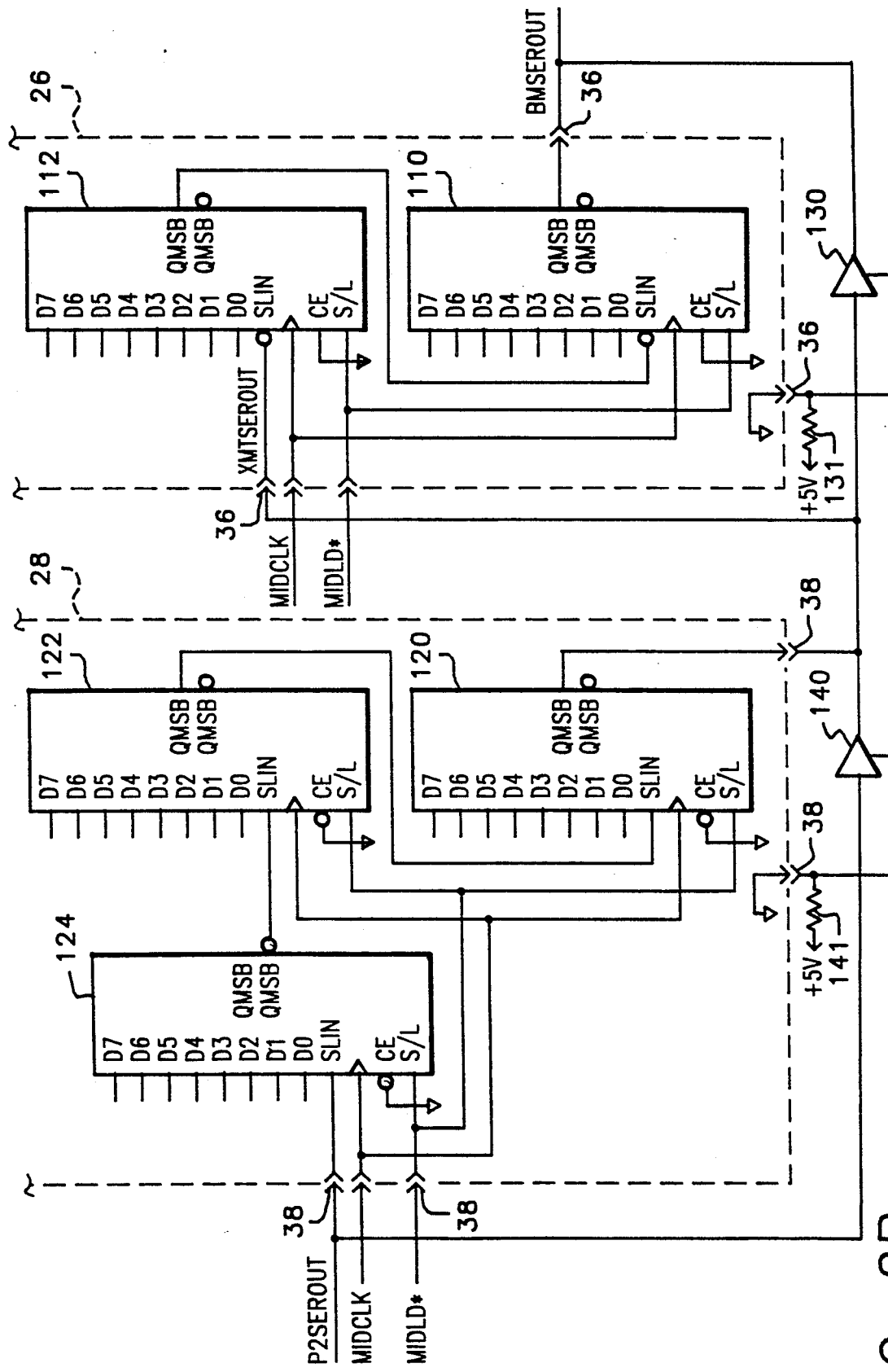
Figure 2C:
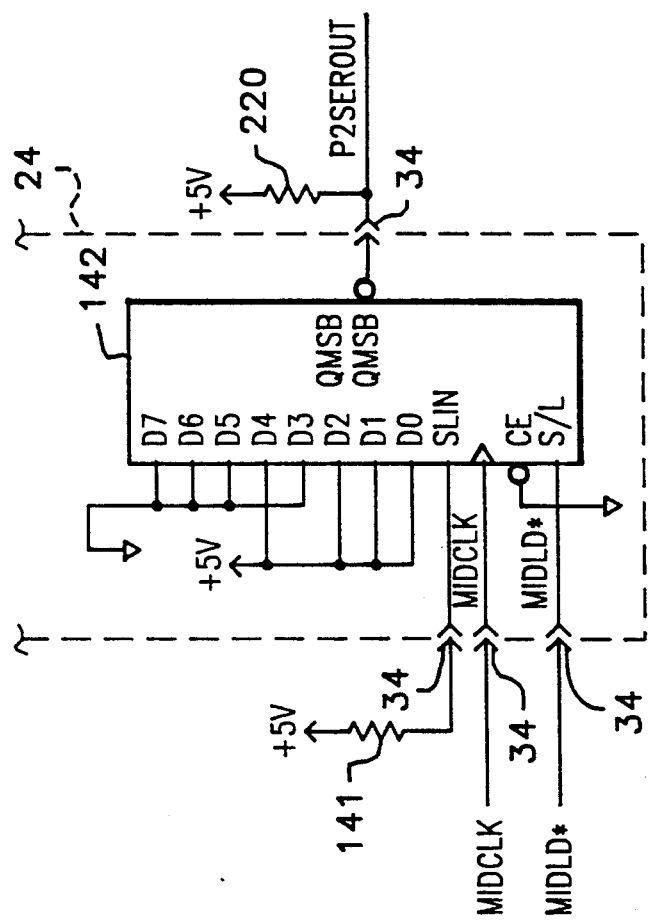

Referring now to FIGS. 2A, 2B, and 2C, the system board logic 32, the CPU1 20, the CPU2 24 and each of the memory boards 26 and 28 that are configured within the system C have associated with them shift registers that receive identification and configuration data according to the present invention. The shift registers used in FIGS. 2A, 2B and 2C according to the present invention are 8-bit parallel load, serial in shift registers that include a serial input and a serial output. Each shift register includes a shift load input referred to as S/L. The shift register serially shifts its contents when the S/L input receives a logic high value and parallel loads the signals at its inputs when the S/L input receives a logic low value. Each of the shift registers also includes a clock input and a clock inhibit input. The clock inhibit input of each of the shift registers is represented as an inverted clock enable or CE input in FIGS. 2A, 2B, and 2C, and this input operates such that when it is held low with the S/L input high, the clock input of the shift register is enabled.

Referring now to FIG. 2A, the system board logic 32 includes an 8-bit parallel load, serial in, serial out shift register 100 which is used to identify the type of board present in each of the respective expansion slots 34, 36, and 38 of the system C. The shift register 100 receives two identification signals from the respective board present in each of the respective slots 33, 34, 36, and 38. These identification signals indicate whether a primary processor, a secondary processor, a base memory board, or an expansion memory board is configured in the respective slots 33, 34, 36, and 38. If no board is present in a respective expansion slot 34, 36, or 38, then pull-up resistors connected to the respective shift register inputs pull the respective identification signal input values to a high logic value, which indicates that the respective slot is empty.

The shift register 100 receives two identification signals from each of the CPU1 20, the CPU2 24, the base memory board 26, and the expansion memory board 28 according to the preferred embodiment. Different logic levels are provided on the respective identification signals to indicate base memory, expansion memory, and processor boards. Two signals referred to as P1TYPE1 and P1TYPE0 are provided from expansion slot 33 and are connected to the D7 and D6 inputs, respectively, of the shift register 100. In the preferred embodiment and configuration, the P1TYPE1 and P1TYPE0 signals provide information on the type of CPU1 configured within the system C. Two signals referred to as P2TYPE1 and P2TYPE0 are provided from expansion slot 34 and are connected to the D5 and D4 inputs, respectively, of the shift register 100. The P2TYPE1 and P2TYPE0 signals have logic values which indicate if a memory board or preferably a secondary processor board is configured in the respective expansion slot 34. Pull-up resistors 202 and 204 are also connected to the D5 and D4 inputs, respectively, of the shift register 100. Therefore, if there is no secondary processor board or memory board configured in the expansion slot 34, the D5 and D4 inputs of shift register 100 are at a logic high value, which indicates that the expansion slot 34 is empty. The D7 and D6 inputs of the shift register 100 are not connected to pull-up resistors because the CPU1 20 is not an optional part of the computer system C but rather is the primary microprocessor and therefore is required to be present in the computer system C according to the preferred embodiment. However, an alternate design of the shift register 100 for a multiple processor computer system c in which no single processor is designated as a primary processor is also contemplated.

Two signals referred to as XMTYPE1 and XMTYPE0 are provided from expansion slot 38 and are connected to the D3 and D2 inputs, respectively, of the shift register 100. The XNTYPE1 and XMTYPE0 signals have logic values which indicate that a memory board, preferably an expansion memory board, 28 is configured in the respective expansion slot 38. Pull-up resistors 206 and 208 are connected to the D3 and D2 inputs, respectively, of the shift register 100. Therefore, if there is no memory board present within the expansion slot 38, then the D3 and D2 inputs are at a logic high value, which indicates that the respective expansion slot 38 is empty. Two signals referred to as BMTYPE1 and BMTYPE0 are provided from expansion slot 36 and are connected to the D1 and D0 inputs, respectively, of the shift register 100. The BMTYPE1 and BMTYPE0 signals have logic values which indicate that a base memory board 26 is configured in the respective expansion slot 36. Pull-up resistors 210 and 212 are connected to the D1 and D0 inputs, respectively, of the shift register 100. Therefore, if there is no memory board present within the expansion slot 36, the D1 and Do inputs are at a logic high value, which indicates that the respective expansion slot 36 is empty.

The QMSB or serial output of the shift register 100 is connected to an input of the SGC 30 referred to as the DATAIN input. A serial out signal referred as P1SEROUT from slot 33 is connected to the serial input SLIN of the shift register 100. A memory identification load signal referred to as MIDLD* is connected to the S/L input of the shift register 100. A clock signal referred to as MIDCLK is connected to the clock input of the shift register 100. The MIDCLK signal has eight clock pulses each time a memory identification port in the SGC 30 is accessed. The MIDCLK signal and the MIDLD* signal are both generated by the SGC 30, and the generation of these signals is explained in greater detail below. The inverted CE input of the shift register 100 is tied to a logic low value.

When the MIDLD* signal is asserted low, the board identification signals discussed above are parallel loaded into the shift register 100. Afterward, each clock pulse of the MIDCLK signal serially shifts upward the contents of the shift register 100. On each clock pulse of the MIDCLK signal, the content of the D7 location is shifted to the DATAIN input of the SGC 30, and the signal value at the SLIN input of the shift register 100 is shifted into the D0 location of the shift register 100. The resultant effect is to serially shift the contents of the shift register 100 to the DATAIN input of the SGC 30.

For purposes of this description, CPU1 20 is located in slot 33, CPU2 24 is located in slot 34, base memory board 26 is located in slot 36 and an expansion memory board is located in slot 38. It is noted that the only requirements for location in the preferred embodiment are CPU1 20 in slot 33, CPU2 24 in slot 34, if present, and a base memory board 26 in slot 36, if present. A base memory board 26 or an expansion memory board 28 may be installed in slots 34 or 38.

The CPU1 20 includes a shift register 102 whose D inputs are connected to predetermined logic values that provide information on the type of CPU1 20 that is configured within the system C. The inverted clear enable or CE input of the shift register 102 is connected to a logic low value. The MIDCLK signal is connected to the clock input of the shift register 102, and the MIDLD* signal is connected to the S/L input of the shift register 102. According to one configuration of the CPU1 20 according to the present invention, the D3, D4, D5, D6 and D7 inputs of the shift register 102 are connected to a logic low value and the D0, D1 and D2 inputs are connected to a logic high value. This configuration of predetermined values preferably represents that an Intel Corporation (Intel) 80386 microprocessor is the microprocessor present on the particular processor board that serves as the CPU1 20, but the use of different predetermined signal values and/or the use of other microprocessors as the primary processor CPU1 20 is also contemplated.

The QMSB or serial output of the shift register 102 forms the P1SEROUT signal, which is connected to the SLIN input of the system board shift register 100. Therefore, the processor type information for the CPU1 20 is serially shifted to the system board shift register 100, beginning with the first MIDCLK signal clock pulse. The serial or SLIN input of the shift register 102 is connected to a base memory serial output signal referred to as BMSEROUT.

Referring now to FIG. 2B, the base memory board 26 includes two shift registers 110 and 112 which are used to receive the memory information from each of the respective memory modules which can be placed on the base memory board 26. The MIDLD* signal is connected to the S/L input of each of the shift registers 110 and 112. The inverted clear enable or CE inputs are connected to logic low values. The MIDCLK signal is connected to the clock inputs of each of the shift registers 110 and 112. The D inputs of each of the shift register 110 and 112 are connected to the appropriate memory module configuration signals, which are not shown for clarity, that are provided by each of the respective memory modules that are attached to the base memory board 26. Because the generation of these memory configuration signals is well known to those skilled in the art, their description has been omitted for the purpose of clarity.

The QMSB serial output of the shift register 112 is connected to the SLIN input of the shift register 110. In this way, the two shift registers 110 and 112 behave like one 16-bit shift register. The QMSB or serial output of the shift register 110 forms the BMSEROUT signal, which is connected to the SLIN input of the CPU1 shift register 102 (FIG. 2A). An expansion memory board serial output signal referred to as XMSEROUT is connected to the SLIN input of the shift register 112.

The XMSEROUT signal is also connected to the input of a tristate buffer 130 located on the host bus 22. The output of the tristate buffer 130 is connected to the BMSEROUT signal. The enable input of the tri-state buffer 130 is connected to a pull-up resistor 131 and is also connected to a logic low value generated by the base memory board 26. Therefore, if the base memory board 26 is not present within the expansion slot 36, the tristate buffer 130 is enabled, allowing the base memory shift registers 110 and 112 to be excluded from the daisy chain, and the XMSEROUT signal is shunted to the BMSEROUT signal. If the base memory board 26 is present within the expansion slot 36, then the tristate buffer 130 is disabled, and the base memory shift registers 110 and 112 are included in the daisy chain and act to serially shift the base memory configuration signals to the CPU1 shift register 102.

The expansion memory board 28 includes three shift registers 120, 122 and 124 according to the present invention that store the respective memory module configuration information from the memory modules located on the expansion memory board 28. Three shift registers are used on the expansion memory board 28 in the preferred embodiment because the expansion memory board 28 can receive more memory modules than can the preferred base memory board 26. The MIDLD* signal is connected to the S/L input of each of the shift registers 120, 122 and 124. The inverted CE input of each of the shift registers 120, 122, and 124 is connected to a logic low value and the MIDCLK signal is connected to the clock inputs of each of the shift registers 120, 122, and 124. The D inputs of each of the shift registers 120, 122, and 124 receive memory module configuration signals (not shown) that are output from each of the respective memory modules located on the expansion memory board 28.

The QMSB serial output of the shift register 124 is connected the SLIN input of the shift register 122, and the QMSB serial output of the shift register 122 is connected to the SLIN input of the shift register 120. In this way, the three shift registers 120, 122, and 124 behave like one 24-bit shift register. The QMSB serial output of the shift register 120 is the XMSEROUT signal, which is connected to the base memory board shift register 112.

A CPU2 serial output signal referred to as P2SEROUT is connected to the SLIN input of the shift register 124. The P2SEROUT signal is output from a shift register that is associated with the secondary processor CPU2 24 that is configured within the expansion slot 34 of the system C according to the preferred embodiment. The P2SEROUT signal is also connected to the input of a tristate buffer 140 located on the host bus 22. The output of the tri-state buffer 140 is connected to the XMSEROUT signal. The enable input of the tristate buffer 140 is connected to a pull-up resistor 141 and is also connected to a logic low value generated by the expansion memory board 28. Therefore, when the expansion memory board 28 is not present within the expansion slot 38, the tristate buffer 140 is enabled, allowing for the expansion memory shift registers 120, 122, and 124 to be excluded from the daisy chain, and the P2SEROUT signal is directly shunted to the XMSEROUT signal. If the expansion memory board 28 is present within the expansion slot 38, then the tristate buffer 140 is disabled, and the shift registers 120, 122, and 124 are included in the daisy chain.

Referring now to FIG. 2C, the CPU2 24 includes a shift register 142 whose D inputs are connected to certain predetermined logic values that provide information on the type of microprocessor present on the processor board serving as the secondary microprocessor CPU2 24. According to one configuration of the CPU2 24 according to the present invention, the D3, D5, D6 and D7 inputs to the shift register 142 are tied to a logic low value and the D0, D1, D2 and D4 inputs are tied to a logic high value. This configuration of predetermined logic values preferably represents that an Intel 80486 microprocessor is configured as the secondary processor CPU2 24, but the use of different predetermined signal values and/or the use of other microprocessors as the secondary processor CPU2 20 is also contemplated. The inverted clear enable or CE input of the shift register 102 is tied to a logic low value. The MIDCLK signal is connected to the clock input of the shift register 142, and the MIDLD* signal is connected to the S/L input.

The QMSB or serial output of the shift register 142 forms the P2SEROUT signal, which is connected to the SLIN input of the expansion memory board shift register 124. Therefore, the processor type information for the CPU2 24 is serially shifted to the expansion memory board shift register 124 beginning with the first MIDCLK signal clock pulse. A pull-up resistor 220 is connected to the output generated by the expansion slot 34, which is the P2SEROUT signal generated by the CPU2 shift register 142. Therefore, if the CPU2 24 or any other type of memory board is not present within the expansion slot 34, then the output provided by the expansion slot 34 is a logic high value. The SLIN input of the CPU2 shift register 142 is set through slot 34 to a logical high value provided by a resistor 141. The resistor 141 is preferably located on the system board so that the processor boards are full interchangeable in the processor slots. In this way, logic high values are shifted into the CPU2 shift register 142 beginning with the first MIDCLK signal.

Therefore, when the MIDLD* signal is asserted low, the system board shift register 100, the CPU1 shift register 102, the base memory board shift registers 110 and 112, the expansion memory board shift registers 120, 122, and 124 and the CPU2 shift register 142 parallel load their respective identification or configuration data on their respective D inputs. The MIDCLK signal then begins a sequence of 8 clock pulses, which serially shifts the data located in a respective shift register to the next successive shift register in the daisy chain. The data located in the system board shift register 100 is serially shifted into the memory identification port inside the SGC 30. In this way, the system configuration data loaded in each of the shift registers 100, 102, 110, 112, 120, 122 124, and 142 is serially shifted into the memory identification port inside the SGC eight bits at a time.

It is irrelevant according to the present invention as to which of the expansion slots 36 and 38 actually have memory boards present because the expansion slots 36 and 38 that do not have memory boards are simply bypassed by the associated tristate buffer 130 and 140, respectively. In addition, it is irrelevant as to whether the expansion slot 34 has a board present because the expansion slot 34 occupies the last slot in the daisy chain and the output generated by this expansion slot 34 is connected to a pull-up resister 220.

According to the present invention, it is possible to provide additional expansion slots in the computer system C where additional processor or memory boards could be placed. These additional expansion slots could be located between the CPU1 20 and the last expansion slot 34 in the daisy chain or other locations as desired. Additional processor or memory boards would be placed in these additional expansion slots in the daisy chain, and these boards would include shift registers similar to those described above according to the present invention. Additional shift registers could be present on the system board to receive presence and identification information from these additional slots.

Figure 3:
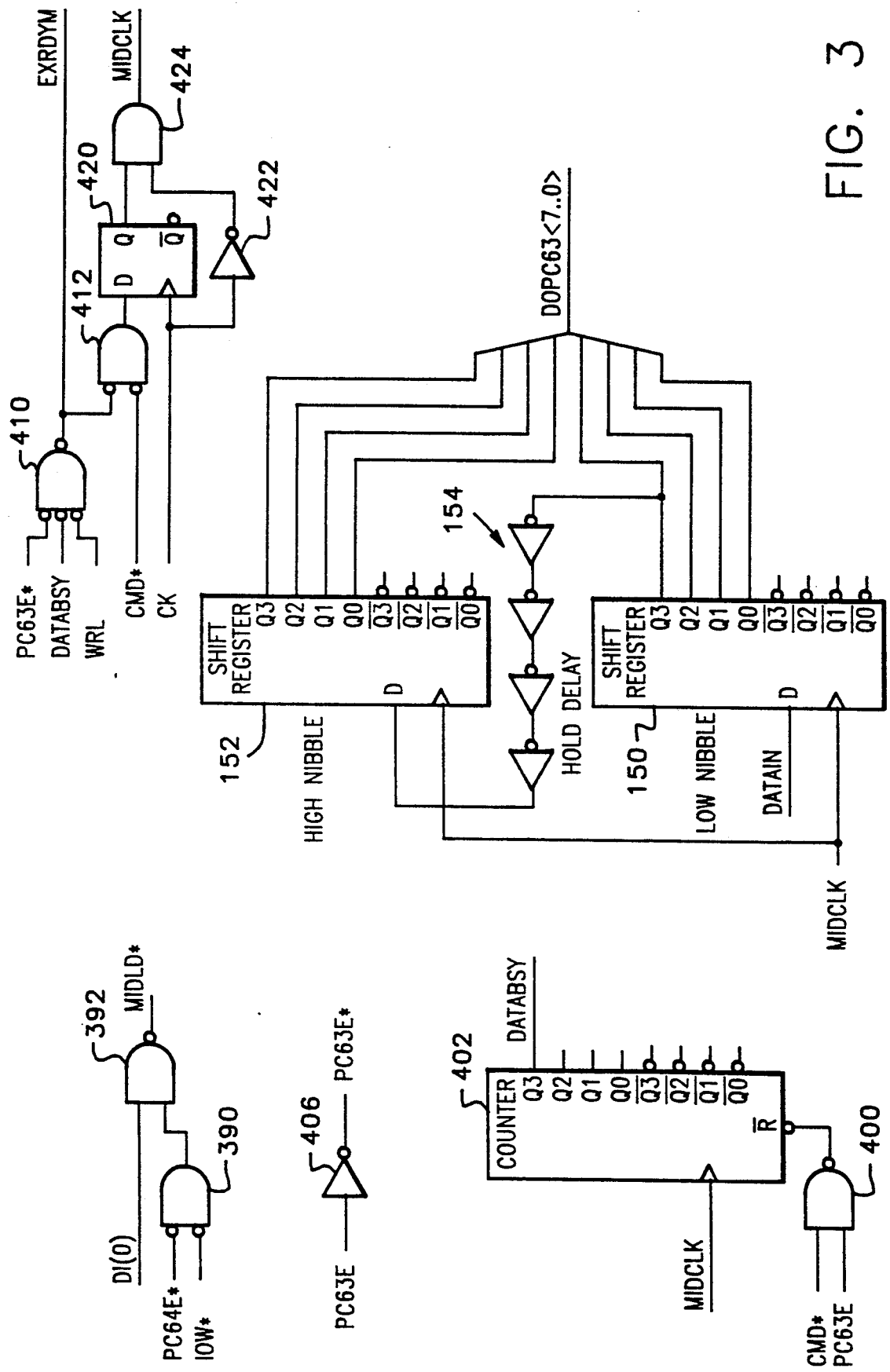
FIG. 3 is a schematic logic diagram of the MEMID ports and associated circuitry in the SGC of FIG. 2A according to the present invention.

Referring now to FIG. 3, the SGC 30 includes memory module identification ports referred to as the MEMID data port and the MEMID control port. In this description, a signal name followed by an asterisk indicates that the signal is asserted when it is at a logic low value. The MEMID control port generates the MIDLD* signal, which controls the loading of the configuration and identification data into the various shift registers 100, 102, 110, 112, 120, 122, 124, and 142 discussed above. The MEMID data port serially receives the system configuration data from the various shift registers 100, 102, 110, 112, 120, 122, 124, and 142 associated with the system board 32, the CPU1 20, the CPU2 24, the base memory board 26, the expansion memory board 28, and the CPU2 24, respectively. The MEMID data port stores this data into appropriate 4 bit serial in, parallel out shift registers 150 and 152. These shift registers 150 and 152 then transmit the data in parallel to the system C so that it can determine the processor type and memory configuration of the system C.

When the system configuration is to be determined, the system C, preferably the CPU1 20, writes a value to a bit in the MEMID control port which asserts the MIDLD* signal. The MEMID control port is preferably located at port address OC64h. A decoded address signal for port address OC64h referred to as PC64E* and an I/O write strobe signal referred to as IOW* are connected to the inputs of a 2-input NOR gate 390. The output of the NOR gate 390 and bit 0 of the data bus referred to as DI<0> are connected to the inputs of a 2-input NAND gate 392 whose output is the MIDLD* signal. Therefore, when the system C writes a one value to bit 0 in the MEMID control port, the MIDLD* signal is asserted low for one cycle. This parallel loads the respective identification and configuration data into the respective shift registers 100, 102, 110, 112, 120, 122 and 124.

On the next bus cycle, the system C can begin reading the data from the MEMID data port to receive the memory configuration information. Referring again to FIG. 3, the DATAIN input of the SGC 30 is connected to the D or serial in input of the shift register 150. The Q0, Q1, Q2 and Q3 outputs of the shift register 150 form the four low order bits of the MEMID data port. The Q3 output of the shift register 150 is also connected to a series of delay circuits 154 to the D or serial in input of the second shift register 152. The Q0, Q1, Q2 and Q3 outputs of the shift register 152 form the four high order bits of the MEMID data port. The clock inputs of the shift registers 150 and 152 are connected to the MIDCLK signal.

Figure 4:
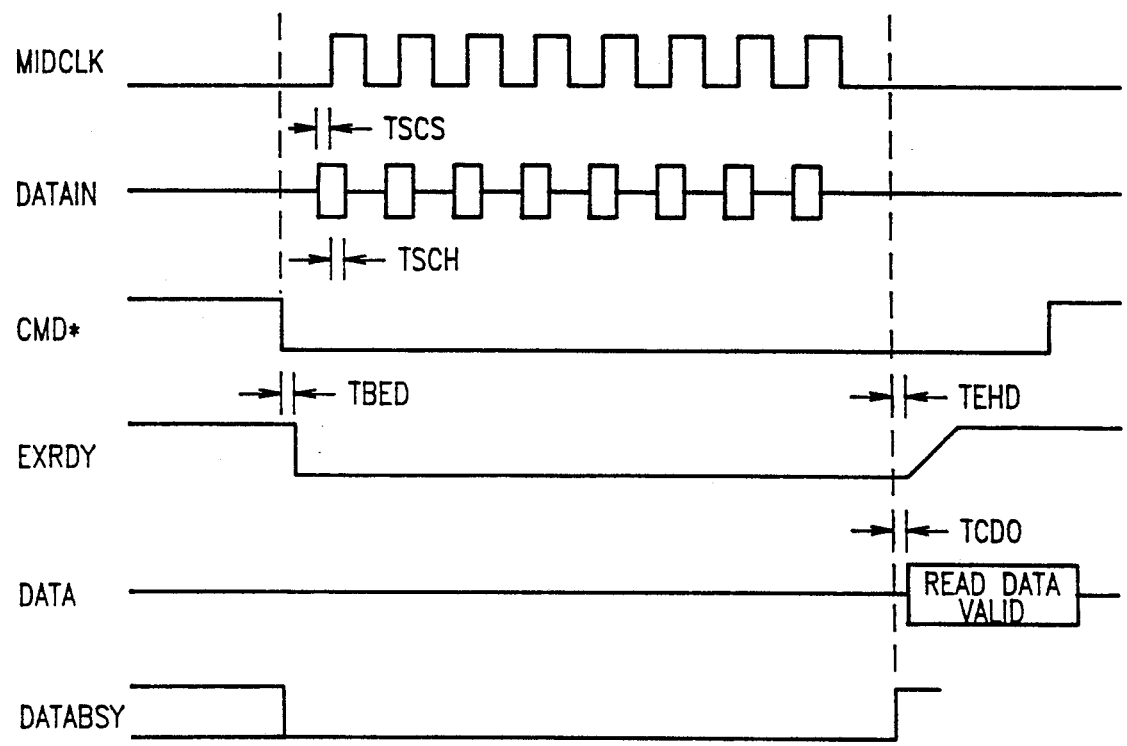
FIG. 4 is a timing diagram of the circuitry of FIG. 3.

A signal referred to as PC63E is the decoded port address signal for the MEMID data port, which is preferably located at port address OC63h. The PC63E signal is connected to the input of a 2-input NAND gate 400. The EISA timing signal referred to as CMD* is connected to the other input of the 2-input NAND gate 400, whose output in turn is connected to the inverted reset input of a 4 bit binary counter 402. The MIDCLK signal is connected to the clock input of the 4 bit binary counter 402. The Q3 output of the counter 402 is a data busy signal referred to as DATABSY. As shown in FIG. 4, the DATABSY signal is negated or a logic low value when the MEMID data port is read, signified by the CMD* signal being asserted low, and the DATABSY signal remains a logical low value for eight MIDCLK signal cycles. Therefore, the 4 bit binary counter 402 serves the function of counting out eight successive serial shifts of data from the system board shift register 100 into the MEMID data port.

The PC63E signal is also connected to the input of an inverter 406 whose output is a signal referred to as PC63E*. The PC63E* signal, the DATABSY signal and a latched write/read signal referred to as WRL, which is high when indicating a write operation is in progress and low when indicating a read operation is in progress, are connected to the inputs of a 3 input OR gate 410. The output of the 3-input OR gate 410 is a ready signal referred to as EXRDYM, which is buffered and synchronized by portions of the SGC 30 not shown and connected to the EXRDY signal present on the EISA bus 42. When the EXRDY signal is low, this is an indication that the particular location being addressed is not ready. The EXRDYM signal remains low during a read to the MEMID data port while the DATABSY signal is negated low. The EXRDYM signal therefore remains negated or low for eight MIDCLK signal cycles, which acts to extend the length of the bus cycle, thereby allowing eight bits of data to be shifted into the MEMID data port from the system board shift register 100.

The EXRDYM signal and the CMD* signal are connected to the inputs of a 2-input NOR gate 412 whose output is connected to the D input of a D-type flip-flop 420. A clock signal referred to as CK is connected to the clock input of the flip-flop 420. In the preferred embodiment of the present invention, the CK signal has a frequency of 14.32 MHz, but the use of other frequencies is also contemplated. The CK signal is also connected to the input of an inverter 422 whose output is connected to one input of a 2-input AND gate 424. The Q output of the flip-flop 420 is connected to the other input of the 2-input AND gate 424, whose output is the MIDCLK signal. Therefore, the MIDCLK signal is a logical low value until one CK signal cycle after both the EXRDYM signal and the CMD* signal are asserted low, after which time the MIDCLK signal mirrors the CK signal for eight cycles. The MIDCLK signal is developed as a clocking signal during a read to the MEMID data port in order to clock eight bits of data from the system board shift register 100 into the MEMID data port.

Therefore, when the MEMID port is read, the EXRDYM signal is negated low to extend the bus cycle until eight bits of data are clocked into the MEMID port from the system board shift register 100. When the eight bit data shift is complete, the data is driven onto the host bus 22 to the CPU1 20, and the EXRDYM signal is asserted high. The system C can then read the next byte on the ensuing cycle, and this process can repeat itself until all of the memory and processor configuration data resident in the various shift registers 100, 102, 110, 112, 120, 122, 124, and 142 has been read by the CPU1 20.

Referring now to FIG. 4, a timing diagram for the MEMID data port is shown. When the MEMID data port is read, signified by the CMD* signal being asserted low, the DATABSY signal is negated low, which in turn forces the EXRDY signal to be negated low. This activates the MIDCLK signal, and the data signals from the system board shift register 100 are subsequently shifted into the MEMID port through the DATAIN input on each rising edge of the MIDCLK signal. After eight successive data shifts, the DATABSY signal is asserted high, forcing the EXRDY signal to be negated high and stopping production of the MIDCLK signal on the next rising edge of the CK signal. The eight bits of data are then driven onto the data bus on the host bus 22 through data buffers (not shown). The system C then can continue reading the next byte on the subsequent cycle if desired, or proceed to other operations if all of the identification and configuration information has been received.

Thus, processor type and memory configuration in the computer system C is determined through the use of one 8 bit data port and no addressing capability to the respective processor or memory boards is necessary for this purpose. Instead, shift registers located on each processor and memory board are used to transfer the data in a serial fashion to the 8 bit MEMID data port. The serial configuration of the shift registers and the use of tristate buffers allows this configuration to recognize and account for expansion slots where no processor or memory board has been asserted.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system having a means for determining computer system configuration, the computer system comprising:

a system bus for transferring addresses and data;

a system board containing circuitry forming portions of the computer system, having said system bus located thereon and including means for performing a serial to parallel conversion of data, said means for performing serial to parallel conversion having a serial input and parallel outputs, said parallel outputs coupled to said system bus to allow reading of said parallel outputs, said means for performing serial to parallel conversion having a given read address;

a processor coupled to said system bus;

a plurality of slots for receiving removable circuit boards containing circuitry forming portions of the computer system, said slots being connected to said system bus, each of said slots further including a load connection, a configuration serial input connection and a configuration serial output connection, said configuration serial input connections and configuration serial output connections connected together to form a daisy chain, with a last configuration serial output connection being coupled to said system board means for performing serial to parallel conversion serial input and a first configuration serial input connection being coupled to a fixed level;

at least one removable circuit board for insertion in one of said slots, said removable circuit board including shift register means for performing parallel to serial conversion of data having a load input, a serial input, a serial output and a plurality of parallel inputs, said load input of said shift register means for performing parallel to serial conversion on said removable circuit board being connected to said load connection of said one of said slots, said serial input of said shift register means for performing parallel to serial conversion on said removable circuit board being connected to said configuration serial input connection of said one of said slots, said serial output being connected to said configuration serial output connection of said one of said slots and said parallel inputs receiving removable circuit board configuration information;

means for loading data into said shift register means for performing parallel to serial conversion on said removable circuit board, said means for loading data including means for developing a load signal having an output connected to said load connection of each of said slots, said means for developing a load signal being coupled to said system bus and having a given write address and said load signal being developed when said processor writes to said means for developing a load signal; and means for clocking data through said shift register means for performing parallel to serial conversion on said removable circuit board to said means for performing serial to parallel conversion of data on said system board when said processor requests a read operation of said means for performing serial to parallel conversion of data on said system board.

2. A computer system having a means for determining computer system configuration, the computer system comprising:

a system bus for transferring addresses and data;

a system board containing circuitry forming portions of the computer system, having said system bus located thereon and including means for performing serial to parallel conversion of data, said means for performing serial to parallel conversion having a serial input and parallel outputs, said parallel outputs coupled to said system bus to allow reading of said parallel outputs, said means for performing serial to parallel conversion having a given read address;

a processor coupled to said system bus;

a plurality of slots for receiving removable circuit boards containing circuitry forming portions of the computer system, said slots being connected to said system bus, each of said slots further including a configuration serial input connection and a configuration serial output connection, said configuration serial input connections and configuration serial output connections connected together to form a daisy chain, with a last configuration serial output connection being coupled to said system board means for performing serial to parallel conversion serial input and a first configuration serial input connection being coupled to a fixed level;

at least one removable circuit board for insertion in one of said slots, said circuit board including shift register means for performing parallel to serial conversion of data having a serial input, a serial output and a plurality of parallel inputs, said serial input of said shift register means for performing parallel to serial conversion on said removable circuit board being connected to said configuration serial input connection of said one of said slots, said serial output being connected to said configuration serial output connection of said one of said slots and said parallel inputs receiving removable circuit board configuration information;

means for loading data into said shift register means for performing parallel to serial conversion on said removable circuit board; and means for clocking data through said shift register means for performing parallel to serial conversion on said removable circuit board to said means for performing serial to parallel conversion of data on said system board when said processor requests a read operation of said means for performing serial to parallel conversion of data on said system board, each slot of said plurality of slots further including a plurality of connections for indicating type of said removable circuit board installed in said slot;

said removable circuit board further including means for connecting to said plurality of connections for indicating type of said removable circuit board for setting the logical level of each of said plurality of connections for indicating type of said removable circuit board; and said system board further including shift register means for performing parallel to serial conversion of data and having a serial input, a serial output and a plurality of parallel inputs, said serial input being connected to said last slot serial output connection, said serial output being connected to said means for performing serial to parallel conversion of data on said system board and said parallel inputs being connected to said plurality of connections of said plurality of slots for indicating type of said removable circuit board.

3. A computer system having a means for determining computer system configuration, the computer system comprising:

a system bus for transferring addresses and data;

a system board containing circuitry forming portions of the computer system, having said system bus located thereon and including means for performing serial to parallel conversion of data, said means for performing serial to parallel conversion having a serial input and parallel outputs, said parallel outputs coupled to said system bus to allow reading of said parallel outputs, said means for performing serial to parallel conversion having a given read address;

a processor coupled to said system bus;

a plurality of slots for receiving removable circuit boards containing circuitry forming portions of the computer system, said slots being connected to said system bus, each of said slots further including a configuration clock connection, a configuration serial input connection and a configuration serial output connection, said configuration serial input connections and configuration serial output connections connected together to form a daisy chain, with a last configuration serial output connection being coupled to said system board means for performing serial to parallel conversion serial input and a first configuration serial input connection being coupled to a fixed level;

at least one removable circuit board for insertion in one of said slots, said removable circuit board including shift register means for performing parallel to serial conversion of data having a clock input for shifting data on an edge of clock input signal, a serial input, a serial output and a plurality of parallel inputs, said clock input of said shift register means for performing parallel to serial conversion on said removable circuit board being connected to said configuration clock connection on said one of said slots, said serial input of said shift register means for performing parallel to serial conversion on said removable circuit board being connected to said configuration serial input connection of said one of said slots, said serial output being connected to said configuration serial output connection of said one of said slots and said parallel inputs receiving removable circuit board configuration information;

means for loading data into said shift register means for performing parallel to serial conversion on said removable circuit board;

means for clocking data through said shift register means for performing parallel to serial conversion on said removable circuit board to said means for performing serial to parallel conversion of data on said system board when said processor requests a read operation of said means for performing serial to parallel conversion of data on said system board; and said means for clocking data further including means for generating a clock signal having an output connected to said configuration clock connection of each of said slots, said means for generating a clock signal being coupled to said system bus and generating said clock signal when said processor requests a read operation of said means for performing serial to parallel conversion of data on said system board, said means for generating a clock signal producing a plurality of clock pulses, said plurality of clock pulses equalling the width of said system board means for performing serial to parallel conversion.

4. The computer system of claim 3, wherein said means for generating a clock signal provides a signal to said system bus to indicate a need to delay said read operation until said means for generating a clock signal has produced said plurality of clock pulses.

5. The computer system of claim 3, wherein said means for loading data includes:

each of said slots further including a load connection;

said removable circuit board shift register means further including a load input which is connected to said load connection of each of said slots; and means for developing a load signal having an output connected to said load connection of each of said slots, said means for developing a load signal being coupled to said system bus and having a given write address and said load signal being developed when said processor writes to said means for developing a load signal.

6. A computer system having a means for determining computer system configuration, the computer system comprising:

a system bus for transferring addresses and data;

a system board containing circuitry forming portions of the computer system, having said system bus located thereon and including means for performing serial to parallel conversion of data, said means for performing serial to parallel conversion having a serial input and parallel outputs, said parallel outputs coupled to said system bus to allow reading of said parallel outputs, said means for performing serial to parallel conversion having a given read address;

a processor coupled to said system bus;

a plurality of slots for receiving removable circuit boards containing circuitry forming portions of the computer system, said slots being connected to said system bus, each of said slots further including a configuration serial input connection and a configuration serial output connection, said configuration serial input connections and configuration serial output connections connected together to form a daisy chain, with a last configuration serial output connection being coupled to said system board means for performing serial to parallel conversion serial input and a first configuration serial input connection being coupled to a fixed level;

at least one removable circuit board for insertion in one of said slots, said removable circuit board including shift register means for performing parallel to serial conversion of data having a serial input, a serial output and a plurality of parallel inputs, said serial input of said shift register means for performing parallel to serial conversion on said removable circuit board being connected to said configuration serial input connection of said one of said slots, said serial output being connected to said configuration serial output connection of said one of said slots and said parallel inputs receiving removable circuit board configuration information;

means for loading data into said shift register means for performing parallel to serial conversion on said removable circuit board;

means for clocking data through said shift register means for performing parallel to serial conversion on said removable circuit board to said means for performing serial to parallel conversion of data on said system board when said processor requests a read operation of said means for performing serial to parallel conversion of data on said system board;

means for determining presence of a removable circuit board in one slot of said plurality of slots; and means for coupling said configuration serial input connection of said one slot of said slots to said configuration serial output connection of said one slot of said slots coupled to said means for determining presence of a removable circuit board.

7. The computer system of claim 6, wherein said means for determining presence of a removable circuit board includes:

said one of said slots further including a presence indication connection;

means for biasing said presence indication connection to a first level connected to said presence indication connection; and said removable circuit board including means for producing a signal at a second level, said signal being connected to said presence indication of said one of said slots.

8. The computer system of claim 7, wherein said means for coupling includes a tri-state buffer having an input, an output and a control, said control connected to said slot presence indication connection, said input connected to said configuration serial input connection and said output connected to said configuration serial output connection, wherein when said presence indication connection is at said first level said tri-state buffer is activated to pass said input to said output and when said presence indication connection is at said second level then said output is disabled.

* * * * *

UNITED STATES PATENT AND TRADEMARK OFFICE
CERTIFICATE OF CORRECTION

PATENT NO. : 5,287,531
DATED : Feb. 15, 1994
INVENTOR(S) : Harry R. Rogers, Jr., et al.

It is certified that error appears in the above-identified patent and that said Letters Patent is hereby corrected as shown below:

In col. 13, line 56, please replace "configuration serial input connection" with --configuration clock connection,--.

In col. 13, line 66, please replace "said circuit" with --said removable circuit--.

In col. 14, line 12, please delete "and".

In col. 14, line 19, please replace "," with --;--.

Signed and Sealed this

Thirteenth Day of September, 1994

Attest:

BRUCE LEHMAN

*Attesting Officer*  *Commissioner of Patents and Trademarks*